US012751377B2

(12) United States Patent
Fried et al.

(10) Patent No.: US 12,751,377 B2
(45) Date of Patent: Oct. 6, 2026

(54) PLANT POT

(71) Applicant: Thrive Planters LLC, San Francisco, CA (US)

(72) Inventors: Michele Fried, San Francisco, CA (US); Avi Hecht, San Francisco, CA (US)

( * ) Notice: Subject to any disclaimer, the term of this patent is extended or adjusted under 35 U.S.C. 154(b) by 121 days.

(21) Appl. No.: 18/745,285

(22) Filed: Jun. 17, 2024

(65) Prior Publication Data

US 2025/0380646 A1 Dec. 18, 2025

(51) Int. Cl.
*A01G 9/02* (2018.01)

(52) U.S. Cl.
CPC .................................... *A01G 9/02* (2013.01)

(58) Field of Classification Search
CPC ........................................................ A01G 9/02
See application file for complete search history.

(56) References Cited

U.S. PATENT DOCUMENTS

| | | | | |
|---|---|---|---|---|
| 2,830,405 A * | 4/1958 | Nydegger | B65D 75/522 47/84 |
| 9,572,303 B2 * | 2/2017 | Salojärvi | A01G 9/16 |
| 11,006,585 B2 * | 5/2021 | Croteau | A01G 9/24 |
| 2007/0175117 A1 | 8/2007 | Brown | |
| 2017/0251642 A1 * | 9/2017 | Capodice | A01G 9/02 |
| 2021/0315166 A1 * | 10/2021 | Wilson | A01G 9/02 |

FOREIGN PATENT DOCUMENTS

| | | | | |
|---|---|---|---|---|
| CN | 204231987 U | 4/2015 | |
| CN | 217088624 U | 8/2022 | |
| ES | 2253933 A1 * | 6/2006 | A01G 2/20 |
| JP | 2018029572 A | 3/2018 | |
| KR | 200423518 Y1 | 8/2006 | |
| KR | 20160004412 U | 12/2016 | |

* cited by examiner

*Primary Examiner* — Joshua D Huson
*Assistant Examiner* — Katherine Anne Kloecker
(74) *Attorney, Agent, or Firm* — Jeremy A. Briggs

(57) ABSTRACT

A plant pot including a base having a base upper portion and a base lower portion is disclosed. The plant pot may further include a pot body attached to a first part of the base upper portion, and a transparent window attached to a second part of the base upper portion. The first part may be different from the second part. The plant pot may further include a door attached to the pot body. The door may be configured to cover a front portion of the transparent window. The door may include a cut-out. The plant pot may further include a shade configured to move between a shade open state and a shade closed state to uncover or cover the cut-out.

10 Claims, 7 Drawing Sheets

PLANT POT

TECHNICAL FIELD

The present disclosure relates to a plant pot.

BACKGROUND

Keeping a plant alive can be challenging, especially when it is unclear what is happening under the soil surface. Plants have different watering needs with some preferring completely dry soil between watering intervals, while others prefer continually moist soil one to two inches below the soil surface. Both overwatering and underwatering can inhibit plant growth and cause a plant to die. Thus, there exists a need for a plant pot that enables the user to see the soil moisture and more confidently know when it is time to water.

Roots typically like to grow in the dark away from harmful UV light, yet being able to observe plant roots helps determine root development and repotting needs. If the roots have grown to the point that the plant becomes rootbound, the plant's health can be compromised and it is time to repot the plant. Thus, there is a need for a plant pot that enables the user to see root development while protecting plant roots from harmful light.

Repotting can be harmful to a plant as the leaves and/or roots can be damaged when the plant is removed. Additionally, repotting can be difficult for a user when a plant is rootbound as removal of the plant from the pot can be challenging. Thus, there is a need for a plant pot that provides better plant protection and easy plant removal during the repotting process.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a plant pot that may include a base and a hollow cylindrical body connected to the base. The cylindrical body may be configured to hold soil and a plant. The cylindrical body may be partially made of an opaque pot body and a transparent body (e.g., a transparent window). In an exemplary aspect, a half portion of the cylindrical body may be made of opaque material, and the other half portion may be made of transparent material. The opaque pot body may be removably attached to the transparent window. Further, the transparent window may be removably attached to the base.

The plant pot may further include a door that may be pivotally connected to the pot body via a hinge, and may be configured to cover or uncover the transparent window. The door may be configured to move between a door closed state and a door open state. In the closed state, the door may be placed over the transparent window outer surface to cover the transparent window to enable the roots to grow in a dark environment. In the door open state, the door may uncover the transparent window to enable a user to see the soil state or plant root state.

In some aspects, the door may include a cut-out that may be located at a door middle portion or a door side portion. The plant pot may further include a shade that may be configured to cover or uncover the cut-out. In some aspects, the door may include a rail that enables the shade to slide on the door to cover or uncover the cut-out. The shade may be removably connected to a door upper edge and/or a door lower edge. In some aspects, the shade may be sandwiched between the transparent window and the door. In such cases, the shade may include a tab that may be accessed by the user to slide the shade to cover or uncover the cut-out.

The present disclosure discloses a plant pot that enables a user to conveniently view/determine the soil state and accordingly better know when to add water to the plant. In addition, the plant pot allows the roots to grow in a dark environment. Furthermore, the plant pot enables the user to easily clean all the plant pot components and more easily and less harmfully remove the existing plant for repotting.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
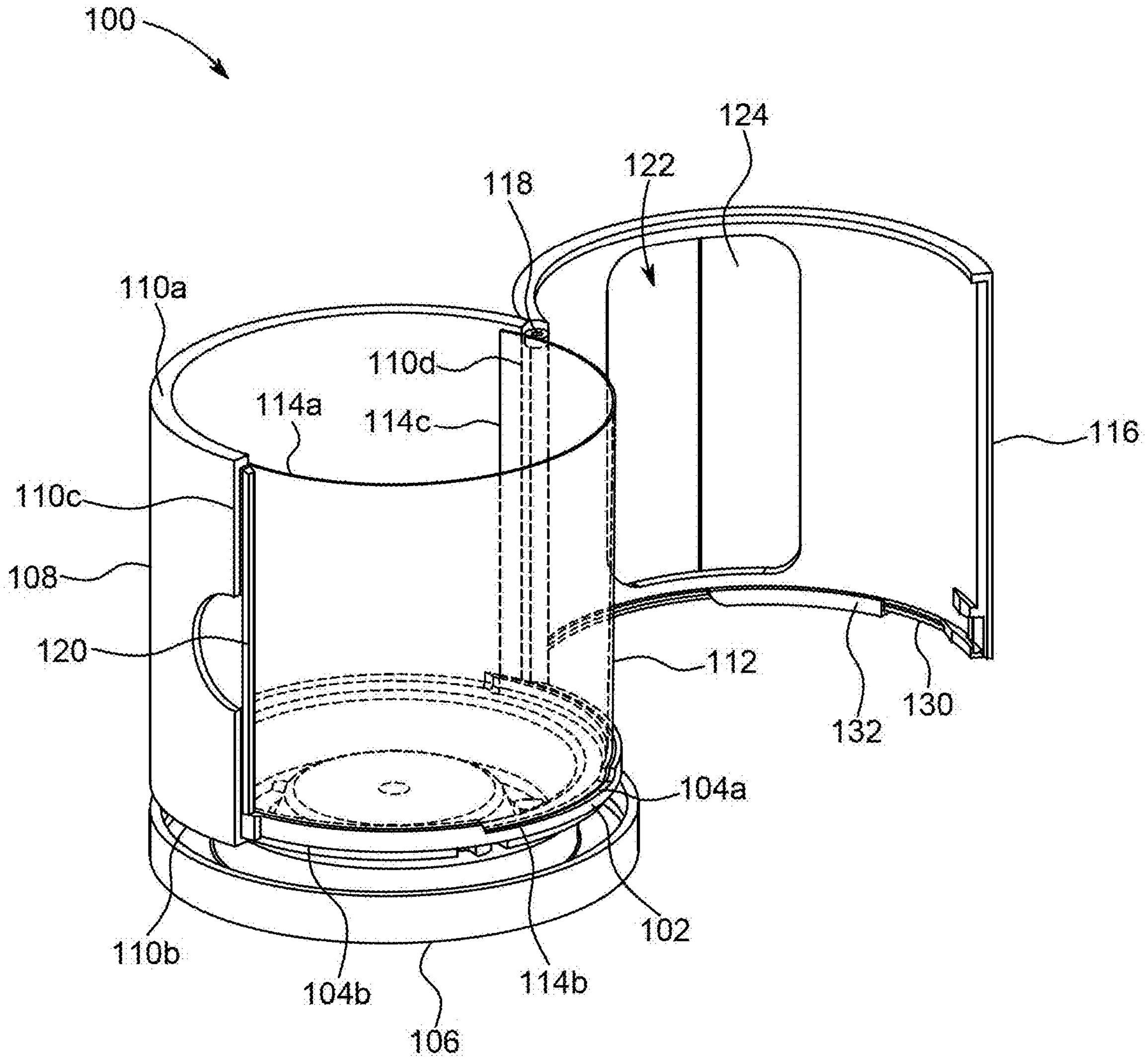
FIG. 1 depicts an example plant pot with a device door in an open state in accordance with the present disclosure.

FIG. 1 depicts an example of the plant pot with a device door in an open state in accordance with the present disclosure. FIG. 1 will be described in conjunction with FIG. 2, and also in conjunction with FIGS. 3-6.

The plant pot 100 may be used by a user to grow and water plants. The plant pot 100 may enable the user to optimally water the plants, so that the plants are not overwatered or under-watered. In some aspects, the plant pot 100 may be a multi-piece device having a plurality of components that may be assembled together, as described below.

The plant pot 100 may include a base 102. The base 102 may be a circular/cylindrical body that may be made of any material such as plastic, metal, etc. The base 102 may have any dimension, based on the expected dimensions of the plant needed to be watered/grown in the plant pot 100. The base 102 may include a base upper portion 104*a* and a base lower portion 104*b*. The base lower portion 104*b* may be configured to be positioned on the ground. In alternative aspects, the base lower portion 104*b* may be configured to be mounted on a saucer 106 that may be secured/placed on the ground. The saucer 106 may include a saucer cavity (not shown) that may be configured to receive the base lower portion 104*b*.

In some aspects, the base 102 may be a hollow body having a closed end at the base lower portion 104*b*, and an open end at the base upper portion 104*a*. In some aspects, a base diameter at the base upper portion 104*a* may be the same as a base diameter at the base lower portion 104*b*. Alternatively, the base diameter at the base upper portion 104*a* may be greater than the base diameter at the base lower portion 104*b*. In an exemplary aspect, the base diameter at the base lower portion 104*b* may correspond to a saucer cavity diameter.

The plant pot 100 may further include a main pot body 108 (or pot body 108) that may be attached to the base upper portion 104*a*. In some aspects, the pot body 108 may be integrated or permanently attached to the base 102. Alternatively, the pot body 108 may be removably connected to the base 102. The pot body 108 may be an opaque body and may be made of any material such as plastic, metal, etc. The opaque body may not allow light to pass through, and may thus facilitate the roots of the plant (disposed inside the plant pot 100) to grow in the dark. The pot body 108 may be an elongated hollow semicircular body (or hollow semi-cylindrical body) having a pot upper edge 110*a*, a pot lower edge 110*b*, and pot side edges 110*c*, 110*d*. The pot lower edge 110*b* may be attached to the base upper portion 104*a*. In some aspects, the pot body 108 may have a constant diameter throughout a pot body height, as shown in FIG. 1. The pot body diameter may be the same as the base diameter at the base upper portion 104*a*. Alternatively, the pot body 108 may have a first diameter towards the pot lower edge 110*b* and a second diameter towards the pot upper edge 110*a*; the second diameter being greater than the first diameter. In further aspects, the pot body 108 may have open ends at the upper and lower portions (e.g., at the pot upper edge 110*a* and the pot lower edge 110*b*). In further aspects, the pot body 108 may be of any other shape including, but not limited to, square, rectangular, and/or the like.

The plant pot 100 may further include a transparent window 112 that may be attached to the base upper portion 104*a*. In some aspects, the transparent window 112 may be attached to the other half of the base upper portion 104*a*, opposite to the half on which the pot body 108 may be attached to the base upper portion 104*a*. Collectively, the pot body 108 and the transparent window 112 may form a hollow cylindrical structure on top of the base upper portion 104*a*. In further aspects, the transparent window 112 may be of any other shape including, but not limited to, square, rectangular, and/or the like.

The transparent window 112 enables the user to view the state of soil/plant roots, when the plant may be growing in the soil placed in the pot body 108. As an example, the transparent window 112 enables the user to see whether the soil is dry or wet, or whether the plant roots require water. The user may view the soil state, and accordingly provide the adequate amount of water to the plant. In this manner, the plant pot 100 enables the user to optimally water the plant that is being grown in the plant pot 100.

The transparent window 112 may be an elongated semicircular body having a window upper edge 114*a*, a window lower edge 114*b*, and window side edge 114*c*. The window lower edge 114*b* may be attached to the base upper portion 104*a*. In some aspects, the transparent window dimensions may be the same as the pot body dimensions. For example, a pot body 108 height may be the same as a transparent window 112 height. Further, a pot body 108 diameter may be substantially the same as or equivalent to a transparent window 112 diameter. Alternatively, the transparent window dimensions may be different from the pot body dimensions. For example, the pot body 108 diameter may be slightly greater than the transparent window 112 diameter. In some aspects, the transparent window 112 may have a constant diameter throughout a transparent window height, as shown in FIG. 1. The transparent window 112 diameter may be the same as the base diameter at the base upper portion 104*a*. Alternatively, the transparent window 112 may have a first diameter towards the window lower edge 114*b* and a second diameter towards the window upper edge 114*a*; the second diameter being greater than the first diameter. In further aspects, the transparent window 112 may have open ends at the upper and lower portions (e.g., at the window upper edge 114*a* and the window lower edge 114*b*).

Figure 4:
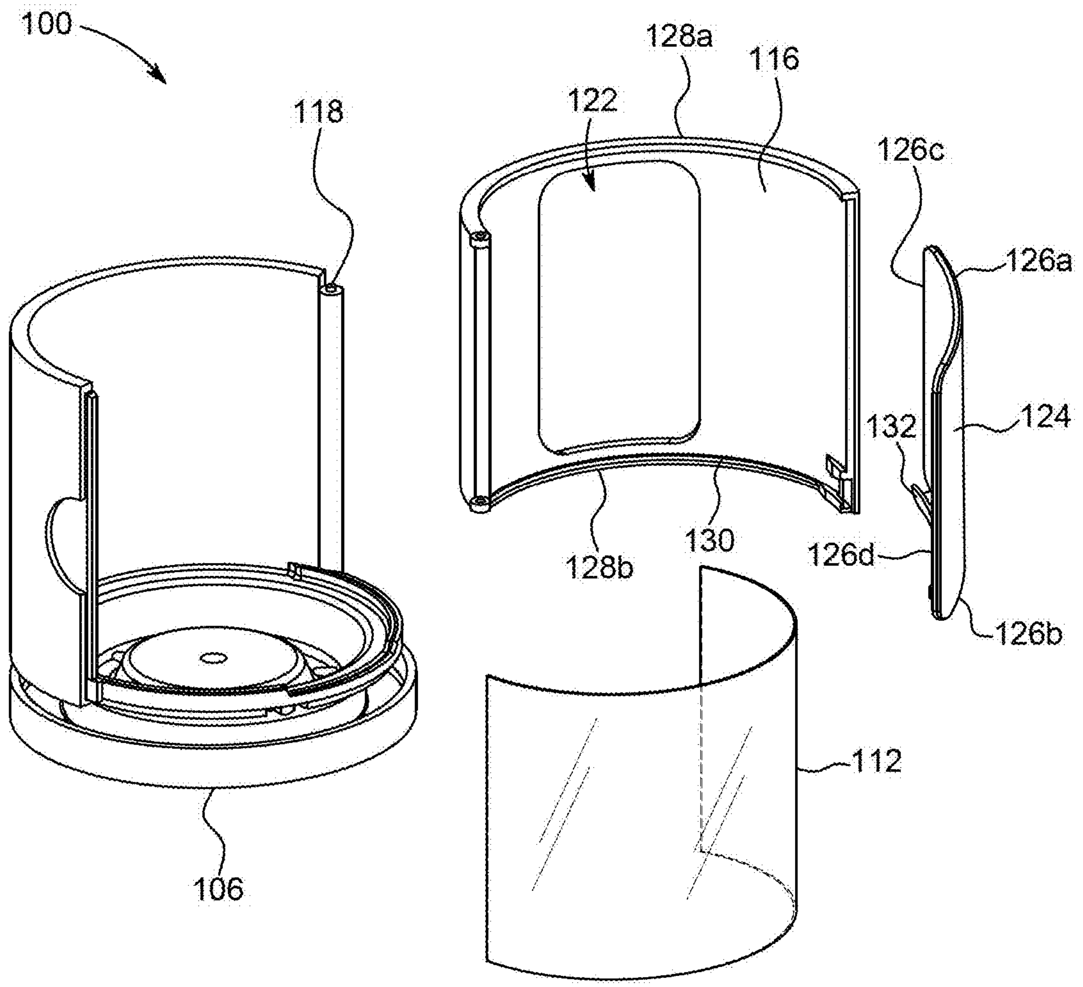
FIG. 4 depicts an example exploded view of the plant pot of FIG. 1 in accordance with the present disclosure.

In some aspects, the transparent window 112 may be removably connected to the base 102 (as shown in FIG. 4), which allows the user to easily remove the plant for repotting, and clean the plant pot 100. The base upper portion 104*a* may include pockets or slots that may be configured to receive the transparent window 112 and/or the pot body 108. The pot body 108 may be disposed on a first part of the base upper portion 104*a*, and the transparent window 112 may be disposed on a second part of the pot body 108. The first part and the second part may be opposite to each other on the base upper portion 104*a*, and may not overlap. Specifically, the pot lower edge 110*b* may be attached to a first half part (or a first semi-circle) of the base upper portion 104*a*, and the window lower edge 114*b* may be attached to a second half part (or a second semi-circle) of the base upper portion 104*a*. The pot body 108 and the transparent window 112 may be attached to equal parts of the base upper portion 104*a*. In alternative aspects (not shown), the pot body 108 and the transparent window 112 may be attached to unequal parts of the base upper portion 104*a*.

In some aspects, the base upper portion 104*a* may include concentric pockets or slots to receive the transparent window 112 and/or the pot body 108. The concentric pockets may include inner pockets located at a first base radius, and outer pockets located at a second base radius. The second base radius may be greater than the first base radius. The pot body 108 may be disposed in the outer pockets, and the transparent window 112 may be disposed in the inner pockets. When the pot body 108 and the transparent window 112 are engaged in the outer pockets and the inner pockets respectively, the pot side edges 110*c*, 110*d* may be positioned in proximity to (and may contact) the respective window side edges. In some aspects, when the pot body 108 and the transparent window 112 are engaged in the outer pockets and the inner pockets respectively, the pot side edge 110*c* may overlap (or be disposed one over the other) with the window side edge 114*c*, and the pot side edge 110*d* may overlap with the other window side edge, which may prevent leakage of soil/water from the interior portion of the cylindrical structure formed by the pot body 108 and the transparent window 112.

A person ordinarily skilled in the art may appreciate from the description above that the pot body 108 and the transparent window 112 may form a hollow cylinder (the interior portion of which may be configured to receive the plant, soil, water, etc.), when the pot body 108 and the transparent window 112 are connected to the base 102. A diameter of the hollow interior portion may be the same throughout the height of the cylinder. Alternatively, the diameter of the hollow interior portion towards the pot upper edge 110*a* and the window upper edge 114*a* may be greater than the diameter of the hollow interior portion towards the pot lower edge 110*b* and the window lower edge 114*b*.

The plant pot 100 may further include a door 116 that may be attached to the pot body 108, and configured to cover or uncover the transparent window 112. The door 116 may be configured to cover an outer face (or front portion/exterior surface) of the transparent window 112. The outer face may be opposite to an inner face of the transparent window 112 that faces the pot body 108. The door 116 may be a semicircular body having dimensions similar to the transparent window 112 dimensions, and may be configured to completely cover/surround/enclose the transparent window 112. For example, a door 116 height may be equivalent to the transparent window 112 height. Further, a door 116 diameter may be equivalent to or slightly greater than the transparent window 112 diameter. The door 116 may be made of any material. For example, the door 116 may be made of plastic or any metal such as aluminum, steel, etc. In some aspects, the door 116 may be made of an opaque material that prevents light from passing through. The door 116 may prevent light from passing through the transparent window 112 when the transparent window 112 may be completely covered by the door 116. The user may uncover the transparent window 112 by opening the door 116, to view the soil state or roots through the transparent window 112.

In some aspects, the door 116 may be removably connected to the pot body 108 (as shown in FIG. 4). In an exemplary aspect, the door 116 may be pivotally attached to the pot body 108 via a hinge 118 (located at the pot side edge 110*c* or 110*d*). The hinge 118 may be a piano hinge, a living hinge, a clip-in hinge, a snap-in hinge, and/or the like. The door 116 may be pivotally attached to the pot body 108 via a hinge 118 such that the door 116 may axially rotate about the edge having the hinge 118 (e.g., the pot side edge 110*c* or 110*d*).

Figure 2:
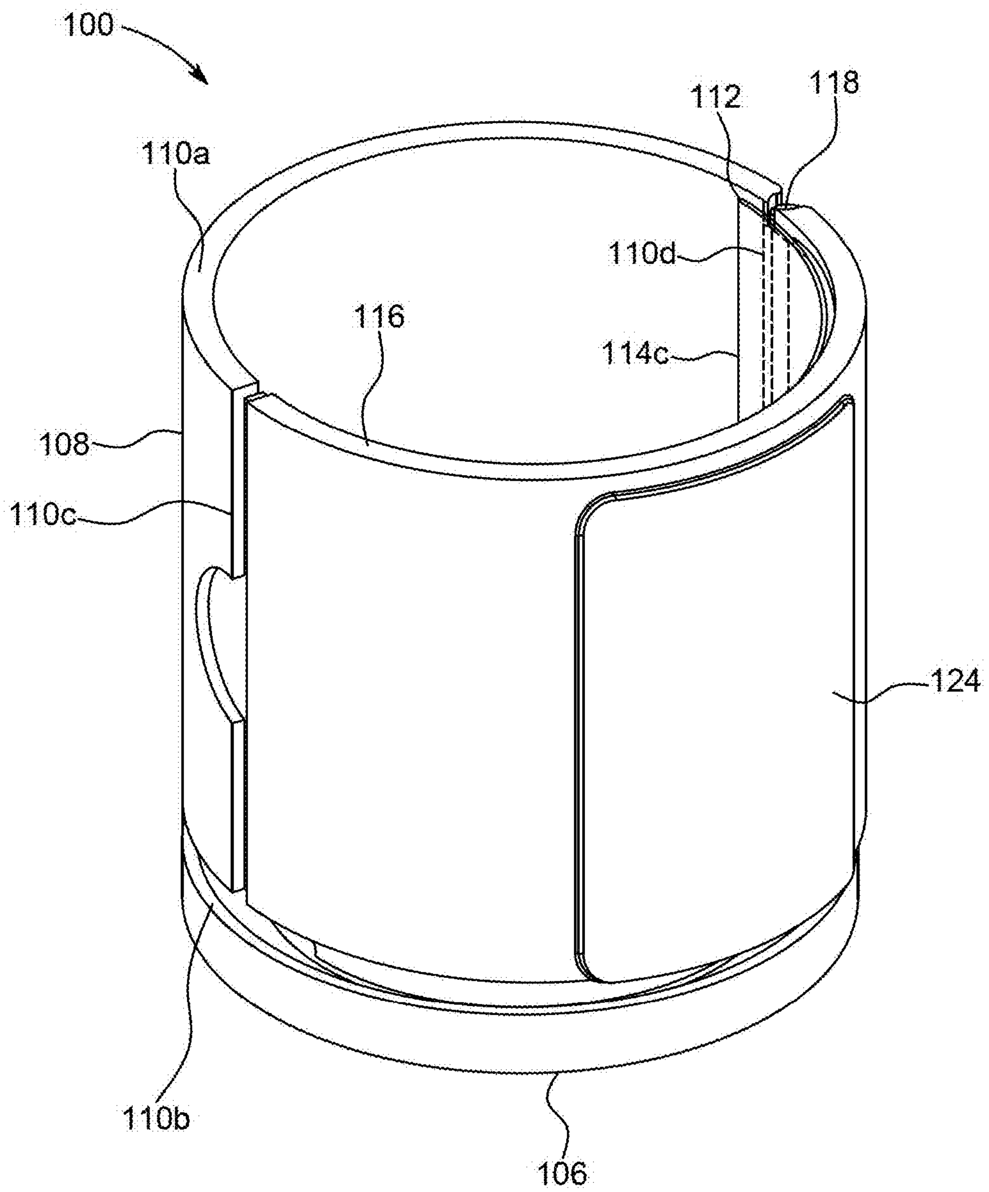
FIG. 2 depicts the plant pot of FIG. 1 with the device door in a closed state in accordance with the present disclosure.

The door 116 may be configured to move between a door closed state and a door open state. In the door closed state, the door 116 may be configured to completely cover or enclose the transparent window 112 (e.g., the outer face of the transparent window 112). Specifically, in the door closed state, the door 116 may be positioned in proximity to the transparent window outer face/surface to completely cover/surround the transparent window 112, as shown in FIG. 2. In the door open state, the door 116 may be located away from the transparent window outer face/surface to uncover the transparent window 112, as shown in FIG. 1.

In further aspects, the pot body 108 may include a latching mechanism (e.g., a latch 120) that may be configured to hold or lock the door 116 in the door closed state. The latch 120 may be located at the pot side edge 110*c* or 110*d* that is opposite to the pot side edge that includes the hinge 118, and may be configured to hold/lock the door 116 in the door closed state. The user may pull the door 116 to move the door 116 from the door closed state to the door open state (e.g., to detach the door 116 from the pot body 108 via the latch 120). The latch 120 may be located in proximity to a door side edge that is opposite to the door side edge that is connected to the pot body 108 via the hinge 118. Stated another way, one door side edge may be connected to the pot body 108 via the hinge 118, and the other door side edge (which may be diametrically opposite to the door side edge described above) may be detachably connected to the pot body 108 via the latch 120.

In addition or alternative to the latching mechanism, the plant pot 100 may include magnets to removably attach the door 116 to the pot body 108. In some aspects, the door 116 may include magnets on one door side edge opposite to the other door side edge that is attached to the pot body 108 via the hinge 118. In further aspects, the door 116 may include magnets on both the door side edges. In the latter scenario, the plant pot 100 may not include the hinge 118, and the door 116 may be attached to the pot body 108 via the magnets. In further aspects, the pot body 108 may include corresponding magnets or ferrous material to hold the door 116 in the door closed state.

Furthermore, the door 116 may include a cut-out 122 (or an opening) that may be located at any position on the door 116 body. In some aspects, the cut-out 122 may be located at a door center portion. In other aspects, the cut-out 122 may be located at a door side portion. The cut-out 122 may cover 5-85% of a total door area. The cut-out 122 may be of any shape. For example, the cut-out 122 may be rectangular. In other aspects, the cut-out 122 may be of any other shape including, but not limited to, circular, oval, square, and/or the like.

The plant pot 100 may further include a shade 124 that may be configured to cover or uncover the cut-out 122. The shade 124 may be made of any material. In an exemplary aspect, the shade 124 may be made of plastic. In some aspects, the shade 124 may be made of opaque material that may not allow light to pass through the cut-out 122 when the cut-out 122 is completely covered by the shade 124. The shade dimensions may correspond to the cut-out 122 area to enable the shade 124 to completely cover the cut-out 122.

Figure 3:
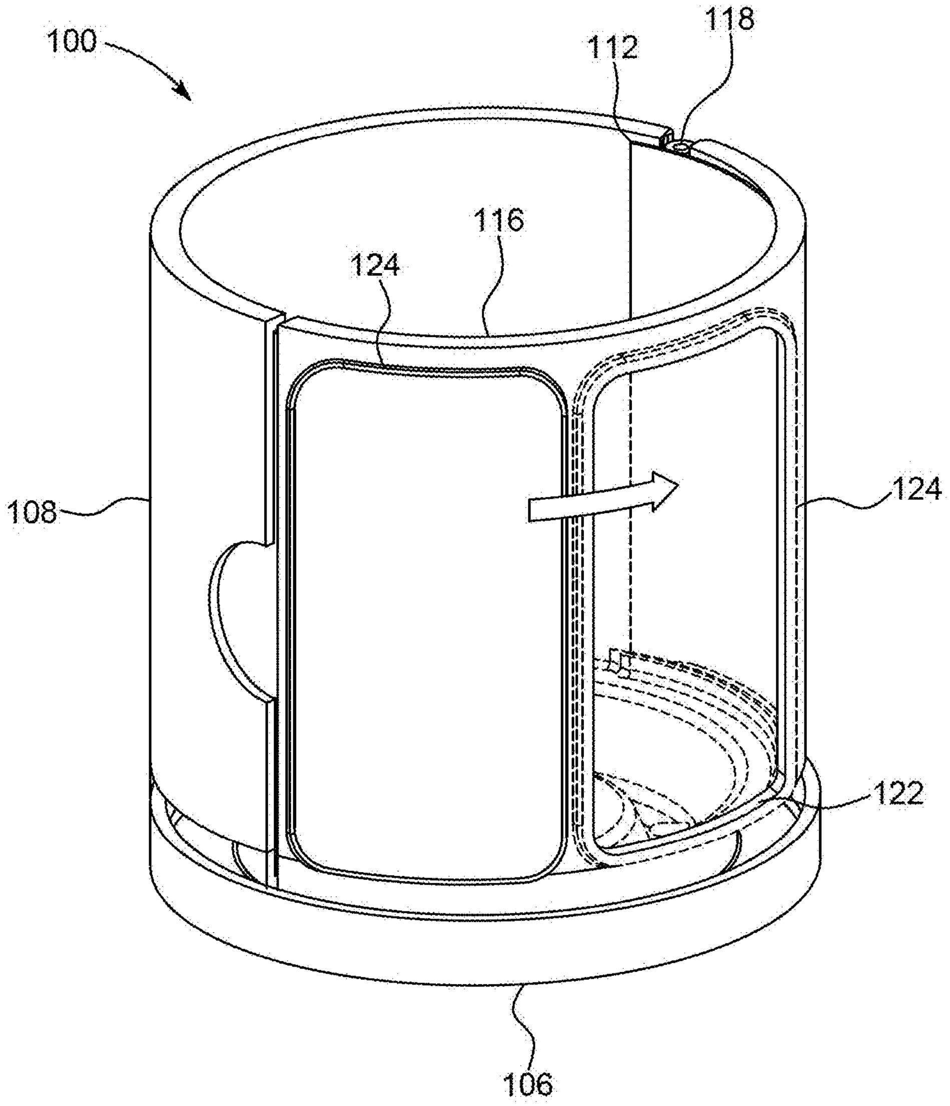
FIG. 3 depicts an example of shade movement in the plant pot of FIG. 1 in accordance with the present disclosure.

The shade 124 may be configured to slide on the door 116 between a shade open state and a shade closed state, as depicted in FIG. 3, to cover or uncover the cut-out 122. In the shade closed state, the shade 124 may be configured to completely cover the cut-out 122, as shown in FIG. 2, to allow the plant roots to grow in the dark. In the shade open state, the shade 124 may be configured to partially or completely uncover the cut-out 122, as shown in FIG. 1, to allow the user to view the soil state or roots. A person ordinarily skilled in the art may appreciate from the description above that the shade 124 enables the user to view the soil state conveniently (e.g., when the user moves the shade 124 to the shade open state), without having to open the door 116 and view the soil state or roots via a completely-open transparent window 112. In some aspects, the shade 124 enables a quick and convenient way for the user to view the soil state or roots.

Figure 5:
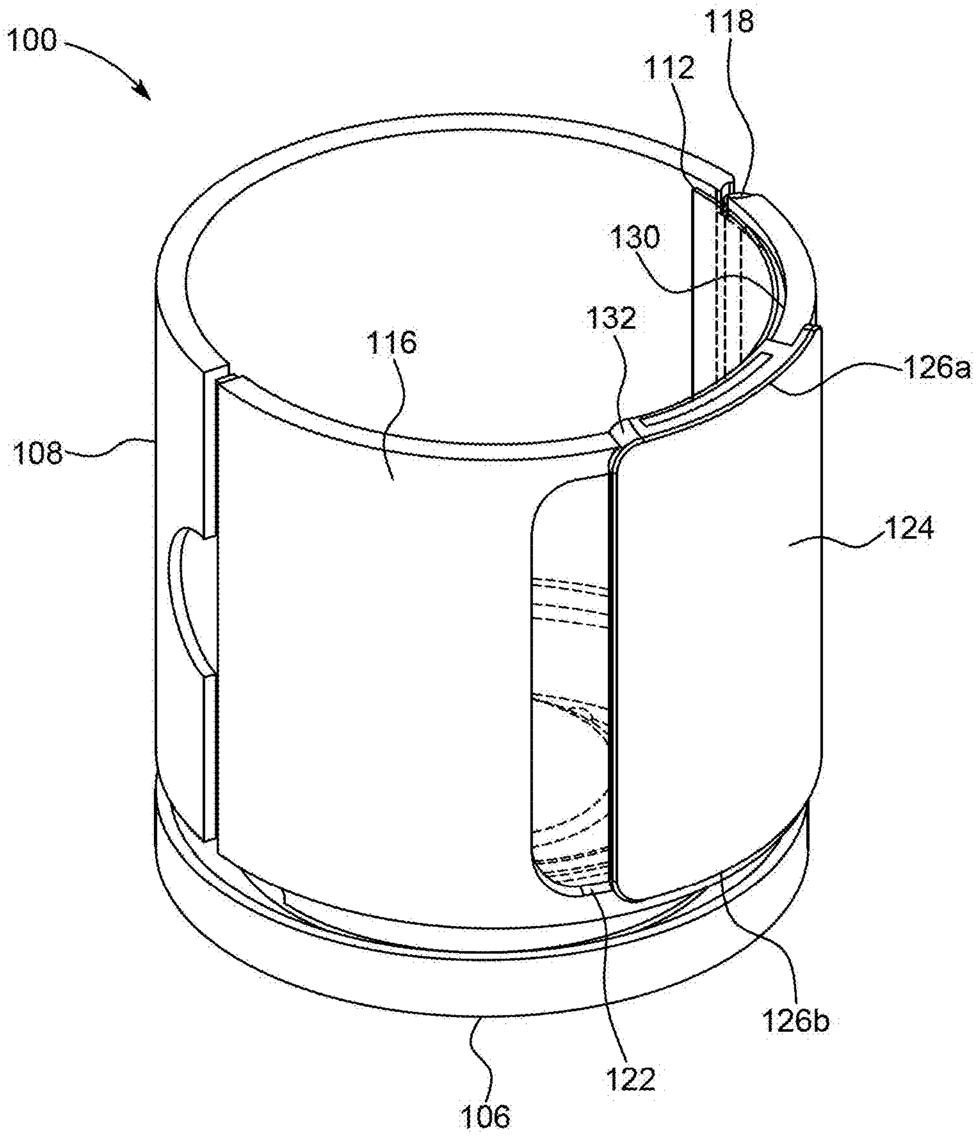
FIG. 5 depicts a first connection between the door and the shade in the plant pot of FIG. 1 in accordance with the present disclosure.
Figure 6:
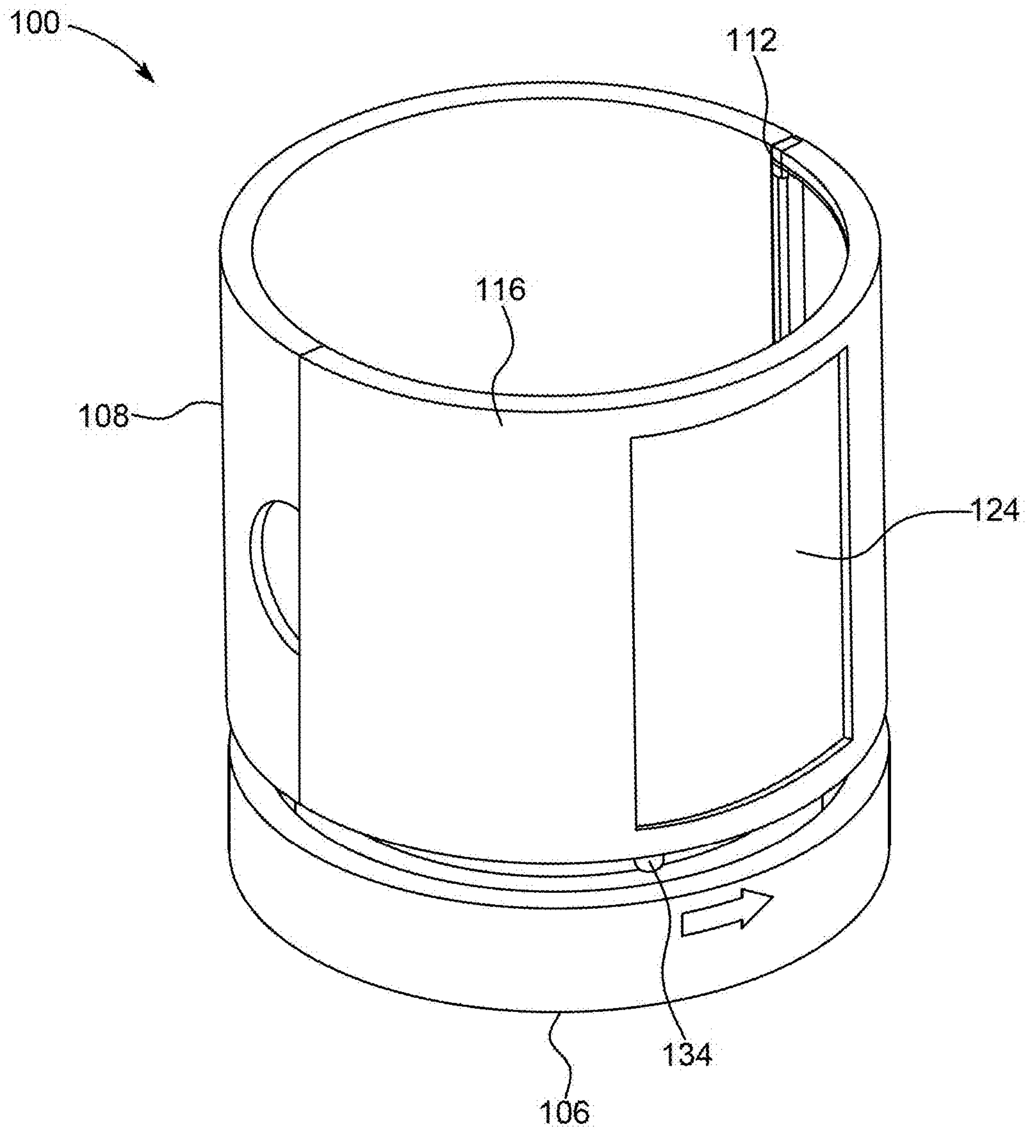
FIG. 6 depicts a second connection between the door and the shade in the plant pot of FIG. 1 in accordance with the present disclosure.

The shade 124 may have a shade upper edge 126*a*, a shade lower edge 126*b*, and shade side edges 126*c*, 126*d*, as shown in FIG. 4. In some aspects, the shade upper edge 126*a* may be positioned in proximity to a door upper edge 128*a*, and the shade lower edge 126*b* may be positioned in proximity to a door lower edge 128*b*. In some aspects, a shade height may be equivalent to or slightly less than a door height. The shade 124 may be removably attached to the door 116 in a plurality of different ways, as shown in FIGS. 4-6. Example ways of attaching the shade 124 with the door 116 are described below, which should not be construed as limiting.

In a first exemplary aspect, the shade 124 may be connected to the door 116 via the shade lower edge 126*b* and the door lower edge 128*b*, as shown in FIG. 4. In the first exemplary aspect of FIG. 4, the door 116 may include a rail

130 at a door interior surface/portion on which the shade 124 may slide between the shade open state and the shade closed state. The shade 124 may include a bracket 132 (e.g., an “L-shaped” bracket or a “U-shaped” bracket) that may be configured to engage with the rail 130 that enables the shade 124 to attach with the door 116, and slide between the shade open state and the shade closed state. In the first exemplary aspect, the bracket 132 may be located at (or towards) the shade lower edge 126*b* and the rail 130 may be located at (or towards) the door lower edge 128*b*, which enables the shade 124 to removably connect to the door 116 at the door lower edge 128*b*. The shade lower edge 126*b* may snap or latch with the door lower edge 128*b*, via the rail 130 and the bracket 132, enabling the shade 124 to be removably connected with the door lower edge 128*b*, while at the same time enabling the shade 124 to easily slide between the shade open state and the shade closed state. In this case, the shade upper edge 126*a* may not be connected to the door upper edge 128*a*.

In a second exemplary aspect, instead of the shade 124 being connected to the door lower edge 128*b*, the shade 124 may be removably connected to the door 116 at via the door upper edge 128*a*, as shown in FIG. 5. In the second exemplary aspect, the bracket 132 may be located at (or towards) the shade upper edge 126*a* and the rail 130 may be located at (or towards) the door upper edge 128*a*. In some aspects, the shade upper edge 126*a* may snap or latch with the door upper edge 128*a*, via the rail 130 and the bracket 132, enabling the shade 124 to be removably connected with the door upper edge 128*a*, while at the same time enabling the shade 124 to easily slide between the shade open state and the shade closed state.

In alternative aspects (not shown), the door 116 may include rails at both the door upper edge 128*a* and the door lower edge 128*b* and the shade 124 may have the bracket 132 at both the shade upper edge 126*a* and the shade lower edge 126*b*, to enable slidable connection of the shade 124 at both the door upper edge 128*a* and the door lower edge 128*b*.

In both the first and secondary exemplary aspects described above, the shade 124 slides on the outer surface of the door 116, i.e., the door 116 is sandwiched between the transparent window 112 and the shade 124.

In a third exemplary aspect, instead of the door 116 being sandwiched between the transparent window 112 and the shade 124, the shade 124 may be disposed between the transparent window 112 and the door 116, as shown in FIG. 6. Stated another way, the shade 124 may be sandwiched between the transparent window 112 and the door 116. In the third exemplary aspect, the door 116 may include rails at (or towards) the door upper edge 128*a*, or at the door lower edge 128*b*, or both the door upper edge 128*a* and the door lower edge 128*b*. The shade 124 may slide between the shade open state and the shade closed state via the rails. In some aspects, the shade 124 may include a tab 134 that facilitates the user to slide the shade 124 between the shade open state and the shade closed state. The tab 134 may be a part of the shade 124 that may be accessed by the user to slide the shade 124. The tab 134 may extend outside the door to allow the user to access the tab 134. The tab 134 may be located at any position. For example, the tab 134 may be located at the shade lower portion (as shown in FIG. 6). In other aspects, the tab 134 may be located at the shade upper portion. In further aspects, the door 116 may include a first layer (e.g., an inner layer) and a second layer (e.g., an outer layer), and the shade 124 may be sandwiched between the first layer and the second layer of the door 116.

In yet another exemplary aspect, shade 124 may be removably connected to the door 116 via magnets. In some aspects, the door 116 may include magnets and the shade 124 may be made of ferrous material. In further aspects, both the door 116 and the shade 124 may include magnets that facilitate magnetic attachment between the shade 124 and the door 116.

In operation, when the user desires to view the soil state (e.g., to check whether the soil is dry or wet), the user may move the shade 124 from the shade closed state to the shade open state. The user may open the shade 124 partially or completely to view the soil state. When the user moves the shade 124 to the shade open state, the user may view the state through the transparent window 112. After viewing the soil state, the user may slide back the shade 124 from the shade open state to the shade closed state to allow the roots to grow in a dark environment. In alternative or additional aspect, the user may use the door 116 to view the soil state. In this case, the user may move the door 116 from the door closed state to door open state to view the soil state, e.g., by pulling the door 116 from the latch 120 and rotating the door 116 about the hinge 118. After viewing the soil state, the user may move back the door 116 from the door open state to the door closed state. Based on the soil state, the user may decide to water the plant (e.g., if the soil is becoming dry).

The user may further disassemble the plant pot 100 for easier repotting (e.g., to take out an existing plant from the side of the plant pot, clean the plant pot 100, and to place a plant in the plant pot 100). To disassemble the plant pot 100, the user may move the door 116 from the door closed state to the door open state, via the hinge 118. When the door 116 may be in the door open state, the user may remove the transparent window 112 (e.g., by detaching the transparent window 112 from the base upper portion 104*a*). The user may take out the existing plant from the interior portion, clean the interior portion, place the transparent window 112 back (e.g., attach the window lower edge 114*b* to the base upper portion 104*a*), and position a plant in the interior portion. The user may then move the door 116 from the door open state to the door closed state to allow the roots to grow in a dark environment. The user may further position the shade 124 in the shade closed position. Alternatively, the user may reassemble the transparent window 112 (e.g., attach the window lower edge 114*b* to the base upper portion 104*a*), move the door 116 from the door open state to the door closed state, and then position the plant in the interior of the device.

To perform deep cleaning, the user may further detach the door 116 from the pot body 108 (via the hinge 118). The user may also remove or detach the shade 124 from the door 116. After detaching the door 116 and/or the shade 124, the user may clean all the device components. After cleaning the components, the user may assemble the components back. For example, the user may attach the door 116 to the pot body 108, attach the shade 124 to the door 116, and so on. This way, the user may clean all the components easily, and perform the process of repotting conveniently.

Figure 7:
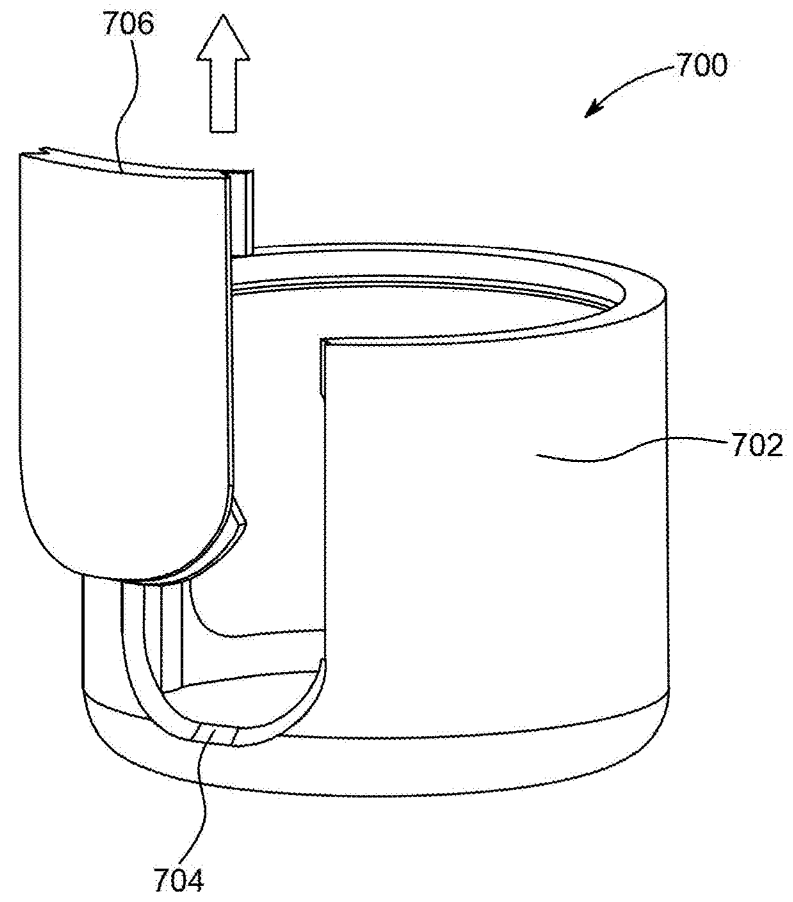
FIG. 7 depicts an alternative embodiment of the plant pot in accordance with the present disclosure.

FIG. 7 depicts an alternate embodiment of a plant pot 700 in accordance with the present disclosure. In this embodiment, the plant pot 700 may include a pot body 702 that may be made of plastic or any other material. The pot body 702 may be a hollow cylindrical body configured to receive the plant. The pot body 702 may include a cut-out 704. In some aspects, a cut-out length may be the same as (or substantially equivalent to) the pot height. In other aspects, the cut-out length may be less than the pot height. The plant pot 700 may include a transparent window (not shown) that may be configured to completely cover the cut-out 704. The transparent window may be removably connected to the pot body 702. Specifically, the transparent window may be configured to slide-in and slide-out vertically to/from the cut-out 704. The dimensions of the transparent window may correspond to the dimensions of the cut-out 704. The plant pot 700 may further include a door 706 that may be configured to cover the transparent window. The door 706 may be removably connected to the pot body 702. Specifically, the door 706 may be configured to slide-in and slide-out vertically to/from the cut-out 704. The door 706 may be an opaque body and may be made of plastic or any other material. The dimensions of the door 706 may correspond to the dimensions of the transparent window. The user may pull/slide the door 706 in an upward direction to view the soil state. After viewing the soil state, the user may slide the door in a downward direction. In further aspects, the door 706 may include magnets (e.g., on door side edges), and the pot body 702 may include corresponding magnets or ferrous material to facilitate magnetic attachment of the door 706 and the pot body 702.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A plant pot comprising:

a base having a base upper portion and a base lower portion, wherein the base is circular in shape;

a pot body attached to a first half part of the base upper portion, wherein the pot body is semi-circular in shape;

a transparent window attached to a second half part of the base upper portion, wherein the first half part is opposite to the second half part, wherein the transparent window is semi-circular in shape, wherein the base upper portion comprises concentric slots having an outer slot and an inner slot, and wherein the pot body is disposed in the outer slot and the transparent window is disposed in the inner slot;

a door attached to the pot body, wherein the door is configured to cover a front portion of the transparent window, wherein the door is semi-circular in shape and comprises a cut-out; and a shade configured to move between a shade open state and a shade closed state to uncover or cover the cut-out, wherein:

the shade comprises a bracket, the door comprises a rail located at a door interior surface, the bracket is configured to engage with the rail and enable the shade to slide on the rail to move between the shade open state and the shade closed state, and the door is disposed between the transparent window and the shade.

2. The plant pot of claim 1, wherein the transparent window is removably attached to the second half part of the base upper portion.

3. The plant pot of claim 1, wherein the door is removably attached to the pot body.

4. The plant pot of claim 1, wherein the door is pivotally attached to the pot body via a hinge, and wherein the door is configured to move between a door open state and a door closed state via the hinge.

5. The plant pot of claim 4, wherein the pot body comprises a latching mechanism to hold the door closed in the door closed state.

6. The plant pot of claim 1, wherein the shade is removably attached to the door, via the rail and the bracket.

7. The plant pot of claim 1, wherein the shade is attached to a door lower edge via the rail and the bracket, and wherein the rail is located at the door lower edge and the bracket is located at a shade lower edge.

8. The plant pot of claim 1, wherein the shade is attached to a door upper edge via the rail and the bracket, and wherein the rail is located at the door upper edge and the bracket is located at a shade upper edge.

9. The plant pot of claim 1, wherein the pot body is an opaque body.

10. The plant pot of claim 1, wherein the door is an opaque body.

* * * * *